United States Patent Office 3,020,935
Patented Feb. 13, 1962

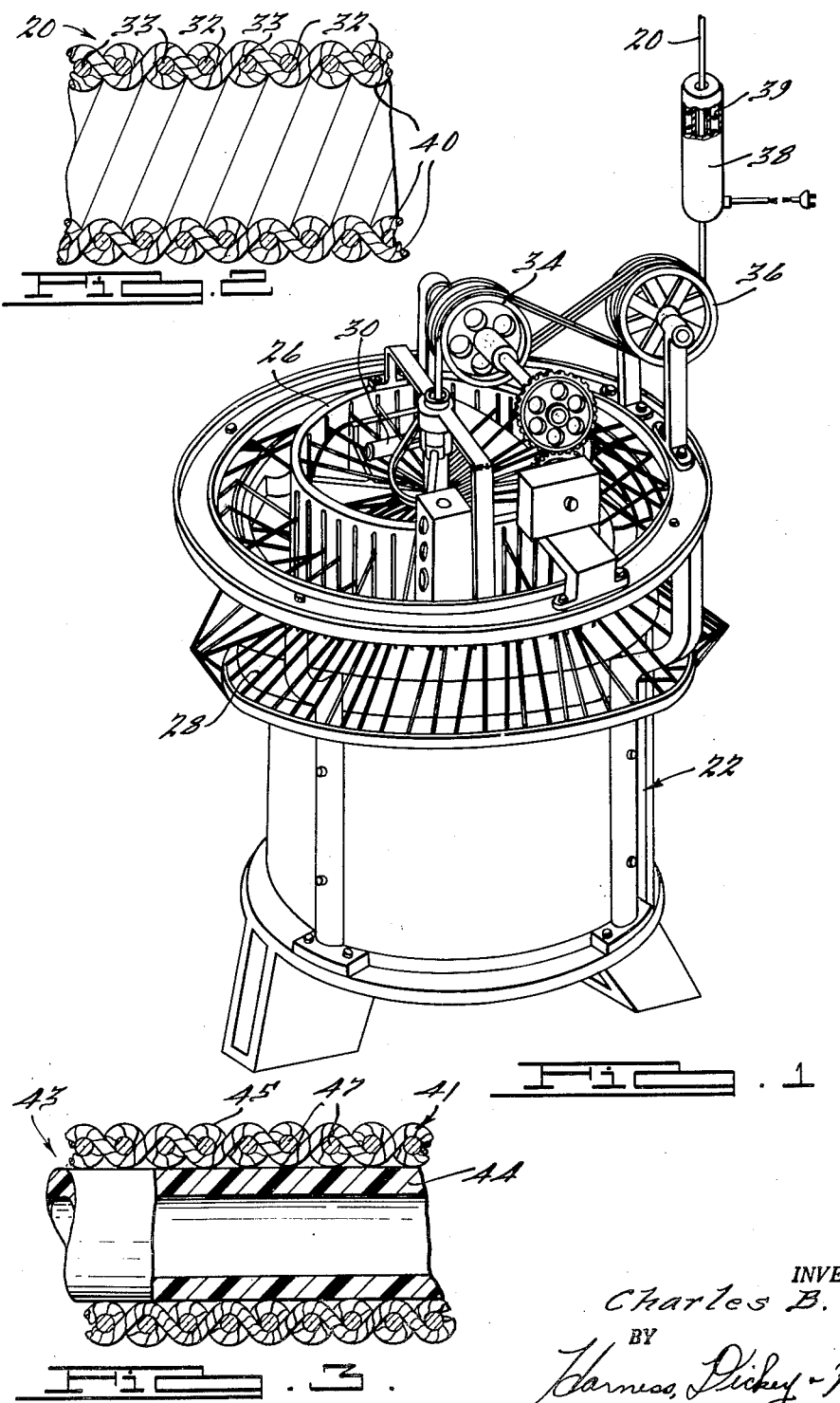

3,020,935
METHOD OF MAKING PLASTIC REINFORCED FABRIC AND ARTICLES MADE THEREBY
Charles B. Balis, Birmingham, Mich., assignor to Frank D. Saylor & Son, Detroit, Mich., a partnership
Filed Feb. 21, 1958, Ser. No. 716,691
8 Claims. (Cl. 139—388)

This invention pertains to improved plastic reinforced woven fabrics and methods of making them, and more particularly, but not necessarily exclusively to such fabrics woven in tubular form.

One important object of the present invention is to provide an improved woven fabric in which selected yarns are rigidified in situ, thereby resisting flexing of the fabric in a preselected direction.

Another object is to provide an improved woven fabric in which selected yarns are rigidified by a hardenable material, which is hardened in situ after the fabric is woven, thereby rigidifying the fabric against flexure in one direction, without correspondingly increasing its rigidity in another direction.

Another object is to provide an improved woven fabric having a predetermined curvature in one direction, in which selected yarns extending in the direction of curvature are rigidified and reinforce the fabric against bending in that direction, and in which the other yarns are flexible so that the fabric retains its flexibility in directions other than the direction of curvature.

Another object is to provide an improved woven fabric in tubular form having self-sustaining shape, improved crush resistance and controllable resistance to bending.

Still another object is to provide an improved method of making a plastic reinforced woven fabric, and especially of making such fabric in tubular form.

These and other objects and advantages are achieved by the practice of the present invention, according to which the hardness of selected yarns of a woven fabric is increased after the fabric is woven, thereby rigidifying the fabric against bending in one direction while retaining to a controllable degree its flexibility with respect to bending in other directions. In the herein described embodiments of the invention, the spiral weft of a woven fabric tube is coated, or impregnated with a hardenable material such as a raw, or partially cured plastic before it is woven, the warp being left uncoated. The hardenable material with which the weft is coated, or impregnated is hardened to rigidify the weft after the tube is woven and while it is held in a desired shape. The rigidified weft provides improved strength and crush resistance to the tube, and also controllably increases the resistance of the tube to bending.

While the practice of the invention is susceptible to a wide variety of uses, it is of especial advantage in the manufacture of woven fabric tubing for such uses as Bowden wire sheaths, covers for rubber or plastic solid wall tubes, weeping hoses for agricultural uses, and for many other applications where the soft yieldability and relatively great strength of a woven fabric tube are desired, together with a hitherto unattainable degree of crush resistance, or hoop strength, and controlled flexibility. The flexibility of tubing made according to the present invention may be retained to any desired degree despite the rigidity provided against crushing.

The invention will now be described in greater detail in connection with the accompanying drawing of which:

FIGURE 1 is a perspective view of apparatus for making plastic reinforced tubing according to the present invention, and particularly illustrating a preferred method of making such tubing;

FIG. 2 is a longitudinal sectional view of a tubular fabric according to the invention; and FIG. 3 is a longitudinal sectional view of a tubular structure according to the invention including a plastic reinforced woven fabric and a solid wall liner.

According to the preferred method of the invention, plastic reinforced tubing 20 is woven on a circular loom 22 of any desired type such as the type disclosed in U.S. Patent Nos. 1,775,325 and 1,915,335. In the loom 22 shown in the drawing, a plurality of vertical heddles (not separately shown) are mounted within a cylindrical frame 26 and vertically reciprocatable therein to carry the warp ends 28 up and down and thus to shed the warp. The weft yarns are wound on bobbins (not shown) which are carried around the loom in shuttles 30. One or more shuttles 30 may be used, depending upon the design of the loom and the strength desired in the woven tubing. The weft yarns are woven along a spiral path, the pitch of which is affected by the number of weft yarns woven simultaneously. Generally, at least two shuttles 30 are used a separate weft yarn being woven from each one. The tubing 20 is woven in open form, and the weft yarns extend along even spiral paths around the tubing, while the warp extends longitudinally along the length thereof. The tube 20 is drawn off upwardly from the center of the machine over a pair of sheaves 34 and 36, which tension the warp.

In the herein described embodiments of the invention, one or more of the weft yarns are impregnated with a hardenable material such as a raw or partially polymerized thermosetting plastic before they are woven in the tube. The hardenable material is hardened only after the impregnated yarns are woven, so that for weaving the impregnated yarns are relatively soft and flexible and may be woven without difficulty. Impregnation may be accomplished by any desired means, such as by passing the weft yarns 32 through a liquid bath of the desired hardenable material before they are wound upon the bobbins. In the present embodiments, the coating or impregnating material is heat hardenable, and therefore after the tubing 20 is woven it is heated by passing it through a heating chamber 38 to harden the hardenable material and thus to rigidify the weft. As shown, the heating chamber 38 may be in the form of a hollow cylinder heated by a spiral electric resistance heating element 39, and is preferably arranged to receive the tubing 20 as it is drawn from the loom 22. The warp yarns 40 are not treated, but retain their full flexibility, so that while the finished tube 20 is reinforced against radial stresses with any desired degree of rigidity or resilience, it remains flexible and may readily be bent around corners and trained along a curved path.

*Example I*

A weeping tube 20 especially suitable for use in underground installation for watering garden plants and the like is illustrated in FIG. 2, and may be made in one-half inch diameter size according to the present invention using 96 warp ends of glass fiber yarn of the type and size commercially designated ECG 150-3/2. The weft comprises two glass fiber yarns 32 and 33 of the type designated 150-4/4, one of which is left untreated. The other weft yarn 33 is specially treated so that it may be hardened after the tube 20 is woven to make the tube self-sustaining in shape and crush resistant.

The weft yarn 33 is first cleaned by heating it to remove all sizing, oil, and other organic matter normally found thereon. It is then treated with a bonding agent to improve the penetration and adhesion of the thermosetting polyester resin with which it is to be subsequently impregnated. One bonding agent particularly suited for use with glass fibre yarns and polyester resins is Volan Methacrylate Chromic Chloride, which is a Werner type chromium complex in isopropanol marketed by E. I. du Pont de Nemours Co.

The yarn 33 is immersed in this bonding agent, and then is passed through a bath of a curable polyester resin. One such bath that has given satisfactory results comprises Polylite 8017, thinned with 10% acetone, and catalyzed with 2% of a mixture of equal parts of benzoyl peroxide and tricresyl phosphate. Polylite 8017 is a relatively viscous polyester resin in a relatively low state of cure and is marketed by Reichold Chemical Co. The bath prepared as described is stable for about four days at room temperature, and the resin may be cured at any time within this period by heating it to about 180° F.

The yarn 33 becomes impregnated with the resin as it is drawn through the bath. It is then passed through a relatively low temperature drying oven to drive off the acetone, leaving the resin tacky and highly viscous, and reducing any tendency for the resin to flow off the yarn. The impregnated yarn is then passed through a shaping die which imparts to it a desired uniform cross-sectional shape and assures an even distribution of the resin along its length.

The yarn 33 is then coated with a thin coating of lacquer which seals in the resin, provides a non-tacky surface, and also protects the resin from contact with the atmosphere. Pyroxylin type lacquers are satisfactory for these purposes, and are preferably applied in a thin coating so that they do not appreciably stiffen the yarn, but leave it fully flexible for weaving. The lacquer not only protects the resin and provides a non-tacky yarn surface, but also keeps the resin from flowing out of the weft yarn 33 into or upon other yarns in the woven fabric. It effectively isolates the resin and confines it to the impregnated yarn 33.

The lacquer is permitted to dry, and the yarn 33 is then wound on a bobbin and woven as a spiral weft in the fabric tube 20. The impregnating resin, not being hardened, does not affect the flexibility of the yarn 33 sufficiently to impair its weaving characteristics or to require special tensioning arrangements.

The take-up sheaves 34 and 36 keep the tubing 20 in fully expanded form as it is drawn from the loom, and as it leaves the second sheave 36 the tubing still in its expanded form passes through the heating chamber 38 where it is heated to about 180° F. or slightly higher to initiate curing of the resin. With this particular resin the curing action is exothermic, and once the cure is started the temperature of the resin rises to about 350° F. After the cure is completed, the tubing 20 may be wound upon a drum, coiled upon itself for convenient shipment, or, if desired, may be cut to length and packed in straight lengths.

The resin hardens as it cures, rigidifying the impregnated weft yarn 33, imparting crush resistance thereto, and increasing the hoop strength of the tubing. The tubing 20 resists crushing forces and retains its shape even under relatively heavy radially directed loads. The inclusion of the non-impregnated weft yarn 32 provides improved "wicking" action and thereby facilitates the passage of water through the tubing wall. This tubing 20 is of especial advantage for use as an underground water distribution element for supplying water to the roots of garden plants, trees, lawns, and the like. Its hoop strength provides against crushing and enables the tubing to retain its shape when it is buried in the ground. Since it is made of glass and a polyester resin, it is highly resistant to rot, mildew, corrosion, and attack by animals such as insects and other garden pests. It may be kept constantly moist so that water borne materials such as lime are not deposited in the pores and interstices of the fabric wall to clog the wall.

Hardening of the impregnated yarn in situ provides important advantages in the practice of the present invention. The impregnated yarn is soft and flexible during weaving, and can be woven on conventional looms without special tensioning devices. Yet after the fabric is woven and the resin is cured, the impregnated yarn may be harder and more rigid than any material capable of being woven and curved to shape during weaving. Moreover, the impregnated yarn is not under stress, as it would be were it hardened before weaving, and it does not tend to unravel when the tubing is cut, nor to present sharp protruding ends.

*Example II*

In another embodiment of the invention as shown in FIG. 3, a reinforced woven fabric tubing 41 is provided with a solid walled liner 44, to make a composite tube generally designated 43. The tube 43 is particularly adapted for use as a fluid conduit such as, for example, a fuel line in a liquid fuel supply system, a suction or pressure conduit in refrigeration apparatus, an air line in a vehicular air suspension system, and like applications where a durable non-metallic, solid walled conduit is desired having improved strength and crush resistance. In making this tubing 43, the liner 44 is fed upwardly through the center of the loom 22 and the fabric tubing 41 is woven around it. For an approximately half inch O.D. tube, the warp 45 may comprise 96 ends of 12 gauge 2 strand cotton, and the weft 47 may comprise two ends of glass fibre yarn, ECG 150-4/8, one end on each bobbin. Both of the weft yarns are treated exactly like the treated yarn in the preceding example, being impregnated with the polyester resin and coated with lacquer. The fabric tubing 41 is woven around the liner 44, which may be of any desired material such as rubber, or a synthetic resin such as tetrafluoroethylene or nylon. If desired, an adhesive may be applied upon the exterior surface of the liner 44 to improve the bond between it and the covering fabric tubing 41. In many cases, this is not necessary, particularly when the liner 44 is sufficiently rigid to be self-sustaining, since normally the covering tubing 41 is woven relatively tightly upon the liner 44, and there is relatively little tendency for the two to separate. After weaving, the tubing is heated to cure the polyester resin with which the weft is saturated.

This construction permits the use of a thinner walled liner 44 than heretofore practicable, thereby reducing the cost of the assembly. The finished tubing is highly abrasion and impact resistant and in general has all the advantages of prior fabric covered tubing together with the added strength provided by the hardened weft. The construction restricts the permissible bending radius of the tubing, thereby preventing kinking and collapse of the liner 44. The composite tubing 43 has relatively low cold flow characteristics, and standard fittings may be used with it for installing it in a system.

*Example III*

A non-metallic flexible cable cover may be made according to another embodiment of the invention of about ¼ inch outside diameter, using 48 ends of 12 gauge, 2 strand cotton yarn for the warp. The weft in this example consists of two ends of twisted paper yarn .05 inch gauge, one end on each bobbin. The paper yarn is impregnated with a catalyzed polyester resin in liquid form, coated with a thin film of lacquer and then woven with the warp to form a woven fabric tube. The tube is heated to cure the resin, and is then coated with a lacquer, or painted for added protection against abrasion and to provide a moistureproof coating to protect the flexible cable which is to be encased within it and also to retain a lubricant. The rigidification of the weft, besides providing crush resistance, also provides added resistance to compression and elongation of the tubing.

The practice of the invention is readily adaptable to a wide variety of uses. Since the selected threads, or yarns of the fabric are hardened in situ after the fabric is woven, it is possible to achieve a relatively high degree of rigidity and strength in a desired direction while retaining flexibility in other directions. The selected yarns may be rigidified to any desired degree, depending upon the specific properties desired, by an appropriate choice of impregnating plastic or other hardenable material, a wide selection of which are commercially available. The selected yarns may be made more rigid than would be the case were they to be rigidified before they are woven, since the yarns normally must flex during weaving, particularly when weaving articles such as tubing or other shaped fabrics.

In fabric tubing according to the invention, the resistance to bending may be readily controlled through the selection of warp and weft yarns, the design of the weave, and the degree to which the weft yarns are rigidified. In general, for a given rigidity and size of weft yarn, a relatively tightly woven tubing will have a greater resistance to bending than a relatively loosely woven tubing. Maximum rigidity and resistance to bending is achieved through the use of relatively fine gauge warp yarns, and a relatively close pick spacing, so that the successive turns of the spiral weft are closely packed together.

What is claimed is:

1. Method of making a tubular fabric having improved hoop strength comprising first applying a hardenable resinous thermosetting material to a flexible yarn, coating said yarn so impregnated with a sealing material, then weaving said yarn as the spiral weft in a tubular woven fabric, and thereafter hardening said hardenable resinous material to rigidify said yarn and thereby to increase the compression hoop strength of said woven tubular fabric.

2. Method of making a fabric comprising impregnating a flexible yarn with a hardenable thermosetting plastic, coating the yarn so impregnated with a sealing material, then weaving said yarn as the weft in a woven fabric, and thereafter curing said plastic to harden it thereby to rigidify said yarn.

3. A woven fabric comprising flexible warp yarns, and a curved weft, said weft being rigidified by a thermosetting plastic and being substantially free of stress when in its normal curved position, said warp yarns being substantially free of said plastic.

4. A woven fabric tube comprising relatively flexible longitudinally extending warp yarns, and a spirally disposed weft yarn, said weft yarn being impregnated with and reinforced and rigidified by a relatively rigid thermosetting plastic, said warp yarns being substantially free of said plastic.

5. A woven fabric tube comprising relatively flexible longitudinal warp yarns, a relatively rigid spirally disposed weft yarn, said weft yarn being impregnated with and reinforced and rigidified by a hardened thermosetting plastic which has been cured after the fabric was woven and while the fabric was held in its expanded tubular form whereby said plastic provides improved hoop strength and crush resistance to said tube without correspondingly decreasing the flexibility thereof, said warp yarns being substantially free of said plastic.

6. A weeping hose having a permeable wall and of self-sustaining shape, said hose having adequate hoop strength to hold its shape and resist crushing when it is buried and comprising a fabric woven in tubular form and including relatively flexible glass fibre warp yarns and a rigidified glass fibre weft yarn, said weft yarn being impregnated with a polyester resin which has been cured after the fabric was woven and while the fabric was conformed to a predetermined cross-sectional shape whereby said weft yarn is relatively rigid and has sufficient strength to resist crushing of said tube, said fabric also including a second weft yarn, said second weft yarn being a relatively flexible non-impregnated glass fibre yarn and being effective to promote the flow of a liquid through the fabric.

7. A woven fabric tube comprising relatively flexible longitudinal warp yarns of cotton or like material, and a relatively rigid spirally disposed weft yarn, said weft yarn consisting essentially of twisted paper strands reinforced and rigidified by a thermosetting plastic which has been cured after the fabric was woven and while the fabric was held in its expanded tubular form whereby said plastic provides improved hoop strength and crush resistance to said tube without correspondingly decreasing the flexibility thereof, said warp yarns being substantially free of said plastic.

8. A composite tube comprising a solid walled relatively non-permeable tubular liner, and a seamless fabric cover woven tightly about said liner, said fabric cover including relatively flexible longitudinal warp yarns and a relatively rigid spirally disposed weft yarn interwoven with said warp yarns, said weft yarn being reinforced and rigidified by a hardened thermosetting plastic which has been cured after the fabric was woven and while the fabric was held in its expanded tubular form whereby said plastic provides improved hoop strength and crush resistance to said tube without correspondingly decreasing the flexibility thereof, said warp yarns being substantially free of said plastic.

References Cited in the file of this patent

UNITED STATES PATENTS

| | | |
|---|---|---|
| 2,009,075 | Thompson | July 23, 1935 |
| 2,146,275 | Thompson | Feb. 7, 1939 |
| 2,353,387 | Canney | July 11, 1944 |
| 2,474,375 | Shearer et al. | June 28, 1949 |
| 2,594,521 | Tingley | Apr. 29, 1952 |
| 2,709,453 | Balis | May 31, 1955 |
| 2,754,848 | Knowland et al. | July 17, 1956 |

FOREIGN PATENTS

| | | |
|---|---|---|
| 1,105,842 | France | July 6, 1955 |